3,037,841
PROCESS FOR SEPARATING IONS
BY ION EXCHANGE
Pawel Krumholz, Rua Maestro Elias Lobo 241,
Sao Paulo, Brazil
No Drawing. Filed Aug. 19, 1958, Ser. No. 755,892
6 Claims. (Cl. 23—23)

This invention relates to an improved process for separating ions by ion exchange and more particularly to the separation of rare earths and of yttrium.

Ion exchange methods have been used extensively as a means of separating ions of similar properties like those of the rare earths elements. Usually the mixture of rare earths is adsorbed on an ion exchange resin bed and eluted with a suitable complexing agent through a resin bed conditioned in such a way as to exchange its cationic component wholly or partially against the rare earths ions. This method represents a true countercurrent extraction method and affords excellent separations of the individual rare earths. However, production capacity per unit of resin is rather small, whereas the consumption of eluting agent, whose economic recovery represents serious technical problems is rather big. It has been proposed alternatively to complex part of the rare earths in a mixture with a suitable complexing agent like ethylenediamine tetraacetic acid, then separating the complexed rare earths ions from the uncomplexed ions by passing the solution through an ion exchange column. This method represents a single contact extraction and permits a rapid but only moderate enrichment of the rare earths forming the most stable complexes. It is obviously impossible to obtain by means of that method any of the rare earths in an approximately pure form.

It is the object of this invention, to provide a simple, practical and efficient process of separating ions by ion exchange based on the principle of pseudocountercurrent extraction. It consists on the elution of an ion exchange resin bed, saturated or nearly saturated with the mixture of the ions to be separated, for instance, a mixture of rare earths ions, with a solution of a suitable complexing agent, for instance, ethylenediamine tetraacetic acid. Such a way of operating an ion exchange column has been used previously in a very rudimentary way in association with the single contacting operation mentioned above. It is the more astonishing, that the true nature and the potentialities of this simple operation have not been recognised or further exploited. The authors even thought, that instead of eluting the resin in a column it would be more desirable to mix the resin in a tank with successive amounts of ethylenediamine tetraacetic acid, which obviously eliminates all possibilities inherent to a countercurrent extraction process.

We found, and it is the principal object of this invention, that if the pseudocountercurrent extraction is operated in such a way, as to represent indeed a great number of theoretical plates it provides a simple, efficient and very economical way of separating ions of similar properties.

The number of theoretical plates depends on the size of the resin, the height of the column and rate of flow of the eluant. Flow-rates as high as several inches per minute may be used. The concentration of the complexing agent in the eluting solution may be as high as 0.2 mole per liter. Any type of a cation exchange resin may be used, preferentially sulfonated polystyrene-divinylbenzene copolymers. The size of the resin may be varied within wide limits, preferentially between 50 and 200 mesh and is the principal factor determinating the necessary height of the column. We found, and it is an object of this invention, that nearly optimal operational conditions are reached with column heights of 3 to 4 feet for a $-100+200$ mesh resin and of 8 to 12 feet for a $-50+100$ mesh resin for column diameters between 4 and 20 inches. We found, and it is an essential feature of this invention, that the optimal column height is nearly independent on the diameter of the column. Separations are nearly the same with columns of 1 inch and 12 inches diameter at the same total height. This behaviour contrasts sharply and very favorably with that of the true countercurrent operation, whose separation efficiency depends essentially on the relation between the lengths of the adsorbed band and its diameter. This particular behaviour, which could not have been predicted, allows the use of columns of diameters quite uncommon in ion exchange separations and signifies a very substantial saving in installation and labor.

We found further, that the efficiency of the pseudocountercurrent separation method depends on the crosslinkage of the resin. Contrary to the common practice with the true countercurrent operation, which uses resin of high (12%) crosslinkage, we found and it is an object of this invention, that resins of lower crosslinkage—preferentially 4%—give better separations.

We found finally, and it is another object of this invention, that separation efficiency increases, if the resin is nearly but not completely saturated with the mixture of the ions. Saturations between 80% and 95% are near to the optimal condition.

If the separation of a binary mixture is performed in the way just described, most of the ion, forming the stronger complex with the eluting agent is obtained near to the maximal possible enrichment (determined by the corresponding separation factor). Then the concentration of that ion drops suddenly and the rest of the other ion may be obtained in a pure or at least highly purified form. If the mixture contains three or more different ionic species, successive fractions are enriched in the different ions, according to the relative stabilities of their complexes (slightly modified by the different affinities of the resin for the different ions). Similarly, like in the elution of a binary mixture, the concentration of the ion forming the most stable complex will drop more or less suddenly and thus the remainder of the eluate will be free or nearly free of that component. The ion, forming the last stable complex can always be obtained, at least in a certain yield in a pure or nearly pure form. Often it may be advantageous and it is an object of this invention to operate the ion exchange unit in such a way as to obtain a mixture of two or more ions (those forming the complexes of the least stabilities) completely or nearly completely free from the other ions (forming the stronger complexes). The final fraction containing one or several ionic components may, according to this invention, be eluted at the highest possible flowrates and concentrations of the eluting agent, as no further separation is aspired to.

We found, and it is an object of this invention, that using the pseudocountercurrent operation as means of such group separations, yields may be improved considerably by recycling an intermediate fraction. This recycling may be achieved in that way, that the solution is freed of most of the complexing agent and charged as mixture with the original feed on the column.

Alternatively, and it is another object of this invention, the complexed solution may be used as such as the first eluant of the column, loaded with the original rare earths mixture.

By operating the ion exchange separation in the way just described, operational cycles of 24 hours and even less may easily be accomplished, using columns of practically any diameter. This amounts to very great savings in storage and handling facilities for the effluent as compared with the true countercurrent operation, whose operational cycle with larger columns may be as high as one month or more.

The production capacity per unit of installed resin is as high as 30 to 50 ionic equivalents processed per day and cubic foot of resin. This capacity is at least one order of magnitude greater than that of a true countercurrent operation and the saving in labor, installation and resin stock more than compensate for the lower separational efficiency of the pseudocountercurrent operation.

The new pseudocountercurrent technique of operating ion exchange columns represents a very useful tool in the separation of the rare earths elements. Any complexing agent may be used as eluant, provided that the stabilities of the corresponding complexes of the different elements to be separated are sufficiently different. A suitable complexing agent is for instance ethylenediamine tetraacetic acid. Ethylenediamine tetraacetic acid is used in form of a solution containing both, its tri- and tetrabasic alkali or ammonium salts and having a pH between 8 and 9.5. The concentration of ethylenediamine tetraacetic acid in this solution is preferentially between 15 and 30 g. per liter. Lower concentrations, down to 5 g. per liter are used, where the rare earths-etylenediamine tetraacetic acid complexes have a low solubility. The efficiency of the separation is but little influenced by the temperature. Lower temperature, however, favours the precipitation of ethylenediamine tetraacetic acid and of some ethylenediamine tetraacetic acid rare earths complexes. It was found favorable to operate columns for the separation of yttrium and ytter earths between 25° and 40° and for the separation of the terbium and cerium earths around 60°.

The effluent solutions may be freed from most of the dissolved ethylenediamine tetraacetic acid by acidification. According to this invention, hydrochloric or nitric acid is added in such a quantity, that the solution is at least 0.07 but preferentially 0.1 normal in free acid. If sulfuric acid is used the final acidity should be at least 0.15 but preferentially 0.18 N. The mixture is agitated during 8 to 16 hours, whereafter the concentration of ethylenediamine tetraacetic acid remaining in the solution drops to less than 0.6 g. per liter. This corresponds at an initial concentration of 20 g. ethylenediamine tetraacetic acid per liter to a recovery of at least 97%. This very high recovery contrasts again very sharply and favorably with the low recovery, economically feasible in a true countercurrent operation.

The solutions freed in that way from almost all of its ethylenediamine tetraacetic acid content may be recharged as such or mixed with the original material on a column and subjected to a new pseudocountercurrent extraction. We found, and it is an object of this invention, that as long as the pH of those solutions is less than 1.5 the residual ethylenediamine tetraacetic acid present in the solution does not prevent a complete adsorption of the rare earths on the resin.

The elution of the final fraction consisting of one or of several elements, whose separation is not aspired to, may be performed at higher flow rates and concentrations of ethylenediamine tetraacetic acid than the elution of the first fractions. In order to prevent excessive precipitation of ethylenediamine tetraacetic acid in the column, the original pH of the eluting solutions, containing 50 to 100 g. of ethylenediamine tetraacetic acid per liter should be at least 8.5. Precipitation of ethylenediamine tetraacetic acid at lower pH values can, however, according to this invention, be prevented by adding a suitable buffer, such as a mixture of acetic acid and an alkali acetate in a molarity equal or not less than one-half of the molarity of ethylenediamine tetaraacetic acid.

The new process, object of this invention, was found especially useful for the purification of crude yttrium concentrates.

It is a special object of this invention to elute an ion exchange column saturated or nearly saturated with the mixture of yttrium and rare earths ions until the effluent is free or nearly free of erbium, thullium, ytterbium and lutetium and at least of the bulk of holmium, to elute the remaining yttrium, dysprosium and lower rare earths without separation and to achieve that separation after recovery of those elements from the final eluate by other means than ion exchange.

It is another object of this invention to free the original material first from dysprosium and the lower elements by other means than ion exchange and to separate yttrium from holmium and the higher rare earths by means of our new pseudocountercurrent process, as described in the preceding paragraph.

Whereas the efficiency of the new pseudocountercurrent technique has been demonstrated on the special example of rare earths, the new method, object of this invention, is by no means restricted to the separation of those elements. On the contrary, it may be used for simple and efficient separations of mixtures of any other ions. Similarly, the new method is by no means restricted to the use of ethylenediamine tetraacetic acid as complexing agent. Nitrilotriacetic acid, hydroxyethylenediamine triacetic acid, diethylenetriamine pentaacetic acid, diaminocyclohexane tetraacetic acid or any other complexing agent may be substituted for ethylenediamine tetraacetic acid.

EXAMPLE I

An oxide mixture containing 4.5% $Er_2O_3$, 2.2% $Ho_2O_3$, the balance being $Y_2O_3$, was dissolved in hydrochloric acid, diluted to a concentration of 13 g. oxides per liter and passed through a column of 4 inches diameter and 8 feet height filled with a $-50+100$ mesh sulfonated polystyrene-divinylbenzene copolymer of 4% crosslinkage, present in its ammonium form. In one experiment (No. 1) the column was completely saturated, in another (No. 2) it was saturated only to 80% of its total capacity. An aqueous solution containing 2% ethylenediamine tetraacetic acid as ammonium salt, adjusted to a pH of 8.4 and heated to 35° was passed through the column at a velocity of 12 liter per hour. Successive fractions of the eluate were collected and analysed for their rare earths content and composition. The corresponding data are shown in Table I.

Table I

| Percent eluted | No. 1 | | No. 2 | |
| --- | --- | --- | --- | --- |
| | Percent $Er_2O_3$ | Percent $Ho_2O_3$ | Percent $Er_2O_3$ | Percent $Ho_2O_3$ |
| 25 | 17 | 6 | 16.5 | 5.5 |
| 9 | 0.25 | 5.5 | 0.6 | 6 |
| 4 | <0.05 | 2.5 | 0.1 | 3.7 |
| 62 | | 0.09 | | 0.21 |

In order to obtain in experiment No. 2 a final fraction of the same purity as in experiment No. 1, the yield of this fraction must be diminished by 6% to 8%.

Those experiments demonstrate the influence of the saturation of the resin on the efficiency of the fractionation.

EXAMPLE II

Two ion exchange columns of 4 inches diameter and 8 feet height filled with a —50+100 mesh sulfonated polystyrene-divinylbenzene copolymer with 4%, respectively, 8% crosslinkage were charged to 95% of their total capacity with the rare earths-yttrium mixture used in Example I and eluted in a similar way. The corresponding data are shown in Table II.

*Table II*

| Percent eluted | 4% crosslinkage | | 8% crosslinkage | |
|---|---|---|---|---|
| | Percent $Er_2O_3$ | Percent $Ho_2O_3$ | Percent $Er_2O_3$ | Percent $Ho_2O_3$ |
| 18 | 23 | 5.2 | 22 | 5.5 |
| 5 | 4.5 | 7.2 | 6.2 | 6.8 |
| 17 | <0.05 | 5.1 | 0.1 | 4.4 |
| 60 | | 0.08 | | 0.23 |

Those experiments demonstrate the influence of the crosslinkage of the resin on the efficiency of the fractionation.

EXAMPLE III

A stainless steel column of 4 inches diameter and 3½ feet height, provided with a water jacket was filled with a —100+200 mesh sulfonated polystyrene-divinylbenzene copolymers of 4% crosslinkage. The resin was saturated to 90% of its total capacity with a solution of rare earths sulfates prepared from an oxide mixture of the composition indicated in Table III. The resin was thereafter eluted with a solution containing 0.6% ethylenediamine tetraacetic acid, adjusted with ammonia to a pH of 8.7 at a temperature of 60° and a flow rate of 3 liter per hour. The corresponding data are shown in Table III.

*Table III*

| Percent eluted | $Er_2O_3$ | $Ho_2O_3$ | $Dy_2O_3$ | $Y_2O_3$ | $Gd_2O_3$* | $Sm_2O_3$ | $Nd_2O_3$ | $Pr_2O_3$ | $La_2O_3$ |
|---|---|---|---|---|---|---|---|---|---|
| 9.65 | 3.85 | 3.8 | 41.5 | 46 | 5 | | | | |
| 9.8 | 0.07 | 0.65 | 37 | 42.5 | 20 | | | | |
| 10.8 | | 0.02 | 7.0 | 27 | 66 | 3 | | | |
| 12.4 | | | 0.2 | 2 | 95 | 5.2 | <0.05 | | |
| 12.55 | | | | <1 | 94 | 27 | 4 | 0.2 | |
| 12.95 | | | | | 67 | 36.5 | 50 | 2.3 | |
| 12.5 | | | | | 9.5 | 0.5 | 30.5 | 11.8 | 2 |
| 11.95 | | | | | | | 0.4 | 0.2 | 57 |
| 7.4 | | | | | | | | | 99 |
| 100% | 0.4 | 0.45 | 9.5 | 11 | 44 | 9.8 | 9.5 | 1.6 | 14 |

*Including $Tb_2O_3$.

EXAMPLE IV

The experiment described in this example is similar to that reported in Example III with the difference, that the original oxides had a different composition and that the pH of the eluting solution was 8.05. The corresponding data are shown in Table IV.

*Table IV*

| Percent eluted | $Dy_2O_3$ | $Y_2O_3$ | $Gd_2O_3$* | $Sm_2O_3$ | $Nd_2O_3$ | $Pr_2O_3$ | $La_2O_3$ |
|---|---|---|---|---|---|---|---|
| 5.5 | 7 | 16 | 48 | 19.7 | 8.7 | 0.3 | |
| 9.8 | 0.5 | <1 | 55 | 26.7 | 16.9 | 0.7 | |
| 10.55 | | | 16 | 51.6 | 30.6 | 1.75 | |
| 10.8 | | | | 41.5 | 54.3 | 3.3 | |
| 10.8 | | | | 4.7 | 90.2 | 5.3 | |
| 11.0 | | | | | 94 | 6 | |
| 11.25 | | | | | 87.5 | 10.5 | 2 |
| 11.8 | | | | | 62 | 17.5 | 20.5 |
| 10.65 | | | | | 32 | 24.5 | 43.5 |
| 7.9 | | | | | 3.5 | 14.5 | 82 |
| 100% | 0.4 | 1 | 10 | 14 | 52 | 8.8 | 13.7 |

* Including $Tb_2O_3$.

EXAMPLE V

The experiment described in this example is identical with that reported in Example IV, except for the composition of the oxide mixture. The corresponding data are shown in Table V.

*Table V*

| Percent eluted | $Sm_2O_3$ | $Nd_2O_3$ | $Pr_2O_3$ | $La_2O_3$ |
|---|---|---|---|---|
| 7.2 | 10 | 78.6 | 10.4 | <1 |
| 9.5 | 1.5 | 85.4 | 12.2 | <1 |
| 9.8 | | 84.5 | 14.6 | <1 |
| 9.8 | | 80.8 | 17.8 | 1.4 |
| 9.9 | | 61.6 | 32.3 | 6 |
| 10.1 | | 34.7 | 28.3 | 37 |
| 10.1 | | 21.4 | 20.4 | 58.2 |
| 10.3 | | 3.2 | 21.0 | 75.8 |
| 10.5 | | <0.1 | 2.8 | 97 |
| 12.8 | | | 0.1 | 99.9 |
| 100% | 0.75 | 42 | 16 | 41.25 |

EXAMPLE VI

An ion exchange column of 12½″ diameter and 12 feet height was filled to a height of 11 feet with a —50+100 mesh sulfonated polystyrene-divinylbenzene copolymer of 4% crosslinkage. 13.500 g. of an oxide mixture with a composition as indicated in Table VI were dissolved in 1000 lt. water and the necessary amount of sulfuric acid and passed at a flow rate of 200 lt. hour through the resin bed. The bed was washed hereafter with 500 lt. of water of 35°. The load corresponds to 91% of the total capacity of the resin. An aqueous solution containing 2.1% ethylenediamine tetraacetic acid as ammonium salt, brought to a pH of 8.55 and heated to 35° was passed through the column at a flow rate of 140 to 160 lt./hour, collecting successive fractions. After most of the heavy earths were removed the final yttrium fraction was eluted with a solution containing 45 g. ethylenediamine tetraacetic acid and 8 g. acetic acid per liter and brought with ammonia to a pH of 7.6, until the effluent was free of rare earths. The corresponding analytical data are shown in Table VI.

*Table VI*

| Fraction | Percent eluted | $Yb_2O_3$ | $Tm_2O_3$ | $Er_2O_3$ | $Ho_2O_3$ | $Dy_2O_3$ | $Y_2O_3$ |
|---|---|---|---|---|---|---|---|
| I | 20 | 6 | 2 | 20 | 5.2 | 11 | 55 |
| II | 1.5 | <1 | | 8 | 6 | 14 | 71 |
| III | 2.9 | | | 1.5 | 7.5 | 14 | 77 |
| IV | 2.9 | | | 0.4 | 6.6 | 15 | 78 |
| V | 2.8 | | | 0.15 | 5.4 | 15 | 79.5 |
| VI | 2.8 | | | 0.07 | 2.4 | 16 | 81.5 |
| VII | 2.8 | | | <0.03 | 1.3 | 16 | 82.5 |
| VIII | 64.3 | | | | 0.06 | 9 | 91 |
| | 100 | 1.2 | 0.4 | 4.2 | 1.8 | 10 | 82 |

Enough sulfuric acid was added to the eluted fractions to maintain an excess of 8 g. sulfuric acid per liter. The solutions were agitated during 16 hours, the precipitated ethylenediamine tetraacetic acid recovered by filtration and used for successive elutions. 96%–98% of the acid were recovered. Yttrium and rare earths present in the filtrates from the ethylenediaminetetraacetic acid were recovered by precipitation with oxalic acid.

EXAMPLE VII

The first fractions from five runs as described in Example VI were freed from their content of ethylenediamine tetraacetic acid by acidulation with sulfuric acid, brought with ammonia to pH 1.55 and passed through a resin bed identical to that used in Example VI. Hereafter the resin was eluted as in Example VI with a solution of ammonium salts of ethylenediamine tetraacetic acid. The corresponding results are shown in Table VII.

Table VII

| Percent eluted | $Yb_2O_3$ | $Tm_2O_3$ | $Er_2O_3$ | $Ho_2O_3$ | $Dy_2O_3$ | $Y_2O_3$ |
|---|---|---|---|---|---|---|
| 36 | 14 | 5 | 48 | 9 | 8 | 16 |
| 8 | 2 | 1 | 6 | 13.5 | 16 | 51 |
| 8 | | | 0.2 | 4 | 18 | 78 |
| 48 | | | | <0.05 | 10 | 90 |
| 100% | 6 | 2 | 18 | 4.6 | 10.5 | 59 |

What I claim is:

1. In a method of separating rare earth and yttrium ions from each other, the steps of eluting a sulfonated polstyrene-divinylbenzene copolymer ion exchange resin bed in cationic form of 50–200 mesh having a length of 3–4 feet and a diameter of 4–20 inches when the mesh size is 100–200 and having a length of 8–12 feet and a diameter of 4–20 inches when the mesh size is 50–100 which ion exchange resin bed is at least 85% saturated with a mixture of rare earth and yttrium ions with a solution of a complexing agent selected from the group consisting of alkali metal and ammonium salts of ethylenediamine tetraacetic acid, nitrilotriacetic acid, hydroxyethylenediamine triacetic acid, diethylenetriamine pentaacetic acid and diaminocyclohexane tetraacetic acid, whereby successive fractions each containing mainly one of said rare earth and yttrium ions to the main exclusion of the others is formed; and separately collecting each of said successive fractions, thereby substantially separately recovering each of said rare earth and yttrium ions.

2. In a method of separating rare earth and yttrium ions from each other, the steps of eluting a sulfonated polystyrene-divinylbenzene copolymer ion exchange resin bed in cationic form of approximately 4% cross-linkage of 50–200 mesh having a length of 3–4 feet and a diameter of 4–20 inches when the mesh size is 100–200 and having a length of 8–12 feet and a diameter of 4–20 inches when the mesh size is 50–100 which ion exchange resin bed is at least 85% saturated with a mixture of rare earth and yttrium ions with a solution of a complexing agent selected from the group consisting of alkali metal and ammonium salts of ethylenediamine tetraacetic acid, nitrilotriacetic acid, hydroxyethylenediamine triacetic acid, diethylenetriamine pentaacetic acid and diaminocyclohexane tetraacetic acid, whereby successive fractions each containing mainly one of said rare earth and yttrium ions to the main exclusion of the others is formed; and separately collecting each of said successive fractions, thereby substantially separately recovering each of said rare earth and yttrium ions.

3. In a method of separating rare earth and yttrium ions from each other, the steps of eluting a sulfonated polystyrene-divinylbenzene copolymer ion exchange resin bed in cationic form of approximately 4% cross-linkage of 50–200 mesh having a length of 3–4 feet and a diameter of 4–20 inches when the mesh size is 100–200 and having a length of 8–12 feet and a diameter of 4–20 inches when the mesh size is 50–100 which ion exchange resin bed is about 85–95% saturated with a mixture of rare earth and yttrium ions with a solution of a complexing agent selected from the group consisting of alkali metal and ammonium salts of ethylenediamine tetraacetic acid, nitrilotriacetic acid, hydroxyethylenediamine triacetic acid, diethylenetriamine pentaacetic acid and diaminocyclohexane tetraacetic acid, whereby successive fractions each containing mainly one of said rare earth and yttrium ions to the main exclusion of the others is formed; and separately collecting each of said successive fractions, thereby substantially separately recovering each of said rare earth and yttrium ions.

4. In a method of separating rare earth and yttrium ions from each other, the steps of eluting a sulfonated polystyrene-divinylbenzene copolymer ion exchange resin bed in cationic form of approximately 4% cross-linkage of 100–200 mesh and having a length of 3–4 feet and a diameter of 4–20 inches which is about 85–95% saturated with a mixture of rare earth and yttrium ions with a solution of a complexing agent selected from the group consisting of alkali metal and ammonium salts of ethylenediamine tetraacetic acid, nitrilotriacetic acid, hydroxyethylenediamine triacetic acid, diethylenetriamine pentaacetic acid and diaminocyclohexane tetraacetic acid, whereby successive fractions each containing mainly one of said rare earth and yttrium ions to the main exclusion of the others is formed; and separately collecting each of said successive fractions, thereby substantially separately recovering each of said rare earth and yttrium ions.

5. In a method of separating rare earth and yttrium ions from each other, the steps of eluting a sulfonated polystyrene-divinylbenzene copolymer ion exchange resin bed in cationic form of approximately 4% cross-linkage of 50–100 mesh and having a length of 8–12 feet and a diameter of 4–20 inches which is about 85–95% saturated with a mixture of rare earth and yttrium ions with a solution of a complexing agent selected from the group consisting of alkali metal and ammonium salts of ethylene diamine tetraacetic acid, nitrilotriacetic acid, hydroxyethylenediamine triacetic acid, diethylenetriamine pentaacetic and diaminocyclohexane tetraacetic acid, whereby successive fractions each containing mainly one of said rare earth and yttrium ions to the main exclusion of the others is formed; and separately collecting each of said successive fractions, thereby substantially separately recovering each of said rare earth and yttrium ions.

6. In a method of separating rare earth and yttrium ions from each other, the steps of eluting a sulfonated polystyrene-divinylbenzene copolymer ion exchange resin bed in cationic form of 50–200 mesh having a length of 3–4 feet and a diameter of 4–20 inches when the mesh size is 100–200 and having a length of 8–12 feet and a diameter of 4–20 inches when the mesh size is 50–100, which ion exchange resin bed is at least 85% saturated with a mixture of holmium, erbium, thullium, ytterbium, lutetium and yttrium ions with a solution of a complexing agent selected from the group consisting of alkali metal and ammonium salts of ethylenediamine tetraacetic acid, nitrilotriacetic acid, hydroxyethylenediamine triacetic acid, diethylenetriamine pentaacetic acid and diaminocyclohexane tetraacetic acid, whereby successive fractions each containing mainly one of said holmium, erbium, thullium, ytterbium, lutetium and yttrium ions to the main exclusion of the others is formed and whereby fractions high in holmium, erbium, thullium, ytterbium and lutetium are also formed; separately collecting each of said successive fractions, thereby substantially separately recovering each of said rare earth and yttrium ions; and subjecting those fractions high in holmium, erbium, thullium, ytterbium and lutetium to a further fractionation so as to separately recover each of the substances.

References Cited in the file of this patent

UNITED STATES PATENTS

| | | |
|---|---|---|
| 2,539,282 | Spedding et al. | Jan. 23, 1951 |
| 2,554,649 | Tompkins | May 29, 1951 |
| 2,694,681 | Bray et al. | Nov. 16, 1954 |
| 2,798,789 | Spedding et al. | July 9, 1957 |
| 2,897,050 | Jaffe | July 28, 1959 |

OTHER REFERENCES

Frost, A. E.: "Polyaminipolycarboxylic . . . amines," Nature, vol. 178, No. 4528, Aug. 11, 1956, page 322.

Topp: Chemical Abstracts, vol. 51, page 5609c (1957).

Smith et al.: Journ. Inorg. Nucl. Chem., vol. 3, pages 243–247 (1956).

Wheelwright et al.: U.S. Atomic Energy Comm. Report ISC–637, "Chelating Agents in Separation of Rare Earth Elements," pages 64–70, 75–80 (1950).